United States Patent [19]
Quirk

[11] 3,797,329
[45] Mar. 19, 1974

[54] SAFETY GUARDS

[75] Inventor: John Andrew Quirk, Burscough, England

[73] Assignee: Atkinson's of Clitheroe Limited, Clitheroe, Lancashire, England

[22] Filed: June 21, 1972

[21] Appl. No.: 264,731

[52] U.S. Cl............................ 74/609, 180/53 D
[51] Int. Cl............................................ F16p 1/04
[58] Field of Search.......... 74/609; 180/53 D, 53 R; 64/21

[56] References Cited
UNITED STATES PATENTS
| | | | |
|---|---|---|---|
| 3,386,312 | 6/1968 | Weasler | 74/609 |
| 1,475,876 | 11/1923 | Rasmussen | 74/609 X |
| 1,499,694 | 7/1924 | Rogers | 74/609 X |

FOREIGN PATENTS OR APPLICATIONS
| | | | |
|---|---|---|---|
| 920,362 | 3/1963 | Great Britain | 74/609 |

Primary Examiner—Benjamin W. Wyche
Assistant Examiner—F. D. Shoemaker
Attorney, Agent, or Firm—Norris & Bateman

[57] ABSTRACT

Safety shield for a drive shaft, typically the output or power take-off drive shaft of a tractor or the like which is operatively coupled to an implement, is located on a mounting in the form of a sleeve, preferably formed from plastics material, clamped to the shaft and provided with a peripheral groove or other bearing formation on which a neck portion of the shield is releasably engaged, said engagement permitting relative rotation between the shield and shaft. The shield is preferably also formed from plastics material.

4 Claims, 1 Drawing Figure

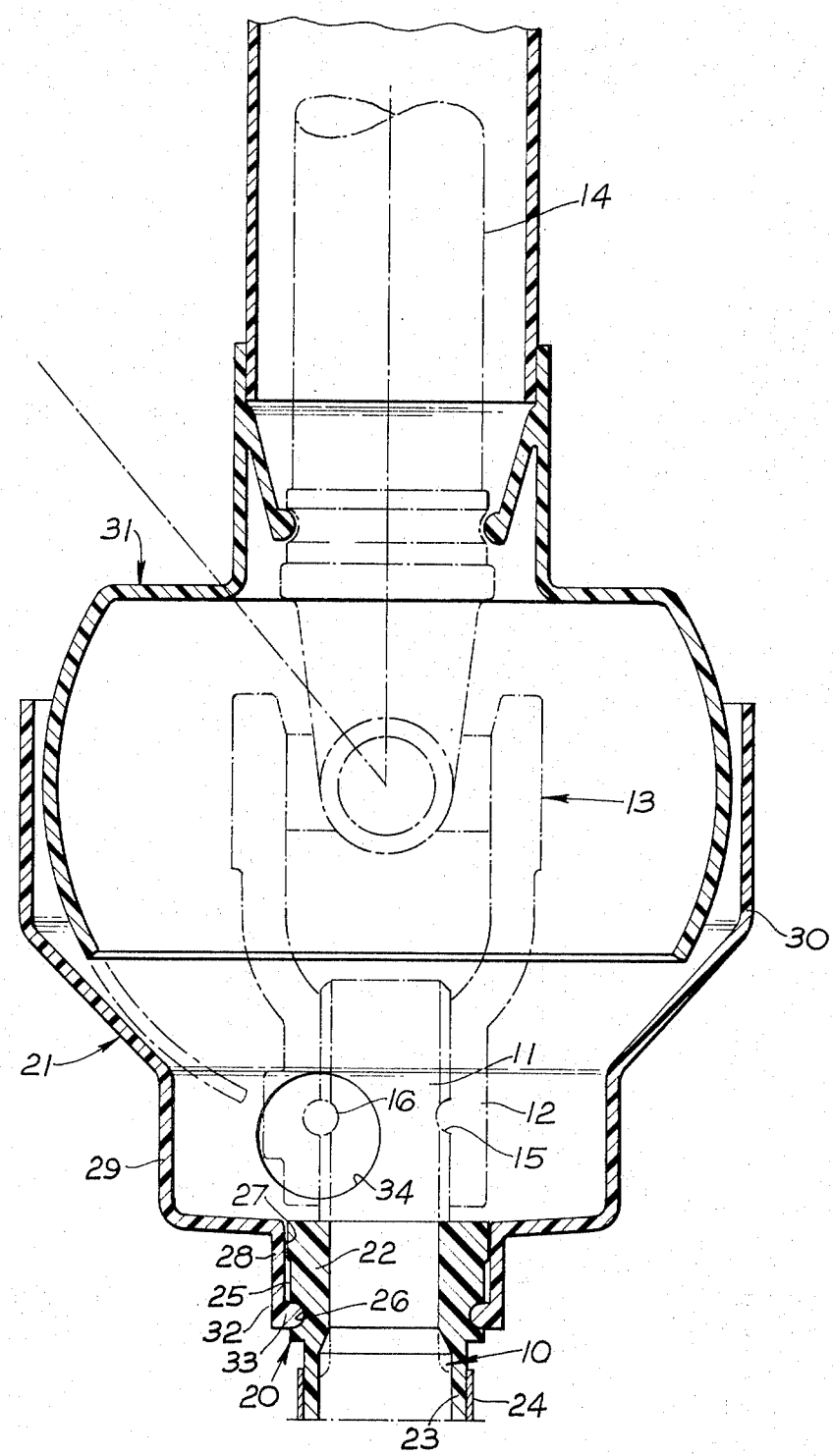

SAFETY GUARDS

This invention relates to safety guards for protecting rotary drive assemblies, particularly power take-off assemblies of the kind including a plurality of shafts operatively coupled end to end for transmitting rotary drive from a prime mover, for example an agricultural tractor, to mechanism of an agricultural or other implement operatively mounted on or trailed by the prime mover, and assemblies of this kind are hereinafter referred to as "Power take-off assemblies."

A standard power take-off assembly used with agricultural equipment includes a drive output shaft journalled on the prime mover as part of the power transmission thereof and having a splined end portion which typically protrudes from a rear part of the transmission housing; and an intermediate shaft, commonly telescopic and provided with universal joints at each end, one joint being releasably coupled to said splined end portion and the other being coupled to a drive input shaft of the implement mechanism in use, the joints permitting relative angular movement between the prime mover and implement.

Safety requirements involve the effective shielding of the otherwise exposed drive assembly, for example the intermediate shaft and its associated joints may be protected by the use of a safety guard of the kind described in our British Pat. No. 920362; or in our co-pending application Ser. No. 264,730 filed June 21, 1972.

The object of the present invention is to provide additional and particularly convenient and effective means for shielding a drive input or output shaft of a drive assembly together with its connection to an intermediate shaft of the assembly in use.

According to the invention a mounting for locating a safety shield about a drive shaft which has an end portion adapted to be selectively drivingly coupled to another member of a drive assembly, is characterised by a sleeve adapted to be secured to an intermediate portion of the shaft and provided with a peripheral bearing formation for engagement with the shield, said engagement permitting relative rotation between the shield and sleeve. A preferred embodiment of the invention is now more particularly described with reference to the accompanying drawing being a sectional view of a guard means mounted on a drive assembly.

The drive assembly includes a drive output shaft 10 of the tractor having a splined end portion 11 protruding from the rear of a transmission housing of the tractor, said end portion being selectively coupled to a yoke 12 of a universal joint 13 at one end of an intermediate telescopic shaft 14 of the assembly, the other end of which is connected through a further universal joint and an input drive shaft (not shown) to the mechanism of an implement operatively mounted on or trailed by the tractor. End portion 11 includes a semi-circular peripheral groove 15 for engagement by a spring-loaded cotter pin 16 which locates the yoke 12 on shaft 10 against axial movement.

The guard means is in two main parts, a mounting 20 and a shield 21. The mounting comprises a sleeve 22 conveniently formed from tough weather-resistant low-friction synthetic plastics material, for example "Rigidex" high density polythene, which is a close sliding fit on an intermediate part of the drive output shaft 10 adjacent the transmission housing, leaving the end portion 11 of the shaft unobstructed.

An end portion 23 of sleeve 22 adjacent the housing in use is split axially and is operatively clamped to the shaft by means of a standard worm drive hose connector 24 or similar device for tightening a band or wire thereabout. The remaining part of sleeve 22 is of greater diameter and its periphery 25 forms a bearing formation including a peripheral groove 26 of semi-circular section around approximately a mid-portion of sleeve 22 and a cylindrical guide face 27 around the end portion of sleeve 22 remote from the transmission housing.

Shield 21 is formed from like plastics material and includes a cylindrical neck portion 28 whose inside diameter corresponds to the outside diameter of guide face 27, said neck merging with a guard portion comprising an increased diameter cylindrical intermediate formation 29 giving sufficient internal clearance for free rotation of yoke 12 with cotter pin 16 therein, and a yet larger frusto-conical portion 30 diverging towards the end of the shield remote from the neck so that the shield is generally bell-shaped. Said frusto-conical portion extends axially beyond the centre line of angular movement of the mounted universal coupling 13 and is of sufficient diameter to freely encompass an end portion of a protective guard 31 mounted on the intermediate shaft, axial overlap between the shield and said guard accommodating angular displacement of the intermediate shaft up to 40° on each side of the tractor output shaft axis.

The free end portion 32 of neck 28 is split axially to define a number of finger-like formations, the ends of said fingers including a radially inwardly directed ridge 33 of semi-circular section corresponding to groove 26.

In use mounting 20 is normally permanently secured on shaft 10 and, when required for use, shield 21 is mounted by being axially pushed along sleeve 22 until ridges 33 on fingers 32 snap-engage in groove 26. When so located guide face 27 further locates shield 21 in the true coaxial relationship to shaft 10. Noramlly shield 21 will revolve with shaft 10 but if it should be obstructed, for example by being caught by the clothing of an operator, the low-friction interface of the plastics material between bearing formation 25 and neck 28 permits the drive assembly and sleeve to rotate freely within the shield.

Yoke 12 can be readily connected and disconnected with shield 21 in the mounted position, access to cotter pin 16 being provided through an aperture 34 in the intermediate part 29 of the shield. Shield 21 can readily be removed by pulling it axially off mounting 20, and the snap-engagement also permits axial displacement if intermediate shaft 14 should accidentally be moved angularly so far out of line with shaft 10 that part of coupling 13 or shaft guard 31 fouls shield 21, thus risk of damage is reduced. If shield 21 is so displaced it can readily be remounted in correct position by the operator without the use of tools so that the safety of the assembly is restored.

Use of the invention substantially reduces the risk of accidental damage to the guard means and is thus a substantial contribution to safety. A damaged shield could be a serious safety hazard.

In some circumstances it is preferred that a safety shield shall be held stationary at all times. In this case neck portion 28 of shield 21 is modified by being provided with a collar including a plurality of radial sockets each locating a ball bearing, said ball bearings being resiliently urged radially inwardly by a spring steel band encircling the collar. The resiliently urged ball bearings will snap-engage with peripheral groove 26 of the sleeve in the same manner as finger ridges 33 described above and permit continuous free rotation of the sleeve and shaft within the shield. In this case, where rotation of the shield is not desired, it is secured by means of a chain and clip to a fixed part of the tractor.

I claim:

1. Safety guard means for a power take-off assembly including a drive shaft having an end portion adapted to be selectively drivingly coupled to an intermediate member of the assembly including a mounting in the form of a sleeve adapted to be secured to an intermediate portion of said shaft and provided with a peripheral bearing formation; and a shield having a neck portion adapted for engagement on the bearing formation, said engagement permitting relative rotation between the shield and sleeve, and a guard portion adapted to extend around an end portion of the shaft and around at least part of another member of the drive assembly when coupled to said end portion; said bearing formation including a peripheral groove to receive resiliently loaded mating formations of the shield neck portion, and a cylindrical guide face axially spaced from said groove for engagement within said neck portion, whereby relative rotation between the sleeve and shield is permitted while supporting the latter in co-axial spaced relationship to the drive shaft, and permitting selective engagement or dis-engagement of the shield from the shaft by relative axial movement thereof.

2. Safety guard means according to claim 1 characterised in that said resiliently loaded mating formations of said neck portion of the shield are provided in a free end portion of said neck split axially to define a number of finger-like formations having radially inwardly directed ridges for mating engagement in said groove.

3. Safety guard means according to claim 2 characterised in that at least said finger-like formations of the neck portion are formed from resilient material permitting snap engagement of the ridges in the groove.

4. Safety guard means according to claim 1 characterised in that the sleeve and the shield are formed from high density polythene, or other tough weather resistant low-friction synthetic plastics material.

* * * * *

UNITED STATES PATENT OFFICE
CERTIFICATE OF CORRECTION

Patent No. 3,797,329          Dated March 19, 1974

Inventor(s) John Andrew Quirk

It is certified that error appears in the above-identified patent and that said Letters Patent are hereby corrected as shown below:

On the first page the foreign application priority data was omitted. Please insert the following after the application number:

Foreign Application Priority Data

July 2, 1971   Great Britain ............... 31054

Signed and sealed this 30th day of July 1974.

(SEAL)
Attest:

McCOY M. GIBSON, JR.          C. MARSHALL DANN
Attesting Officer              Commissioner of Patents